(12) United States Patent
Kim et al.

(10) Patent No.: US 6,314,385 B1
(45) Date of Patent: Nov. 6, 2001

(54) METHOD FOR CONTROLLING MAINTENANCE OF SEMICONDUCTOR FABRICATING EQUIPMENT ARRANGED IN A PROCESSING LINE

(75) Inventors: Sung-geun Kim; Byung-wan Kim, both of Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/168,094

(22) Filed: Oct. 8, 1998

(30) Foreign Application Priority Data

Feb. 3, 1998 (KR) .................................................. 98-2894

(51) Int. Cl.$^7$ ....................................................... G05B 9/02
(52) U.S. Cl. .......................... 702/184; 702/182; 702/183; 702/188; 700/79; 700/108; 700/117
(58) Field of Search ...................................... 702/182–185, 702/33–36, 40, 81–84, 113, 117–119, 121–123, 177, 179, 187, 188, 193, FOR 103, FOR 104, FOR 123–FOR 125, FOR 134–FOR 137, FOR 139, FOR 155, FOR 170, FOR 171; 700/79–81, 83, 108–110, 115–121; 438/14, 17; 414/935

(56) References Cited

U.S. PATENT DOCUMENTS 5,526,293 * 6/1996 Mozumder et al. .................. 700/121
5,923,553 * 7/1999 Yi ........................................ 700/110
5,993,039 * 11/1999 Crill ...................................... 700/79

* cited by examiner

Primary Examiner—Hal Wachsman

(57) ABSTRACT

A method for controlling semiconductor fabricating equipment includes receiving at a maintenance module in a host computer first maintenance data generated from semiconductor fabricating equipment. A value of the first data is compared with a predesignated first reference threshold at the maintenance module. A warning message is displayed on a display device, if the value of the first data is not less than the first reference threshold. If the value of the first data is not less than the first reference threshold, second maintenance data is received, and it is determined whether maintenance of the fabricating equipment occurred. If not, the value of the second data is compared with a predesignated second reference threshold at the maintenance module. If the value of the second data is not less than the second reference threshold, the fabricating equipment is interlocked by the maintenance module, and the fabricating equipment is stopped.

13 Claims, 2 Drawing Sheets

METHOD FOR CONTROLLING MAINTENANCE OF SEMICONDUCTOR FABRICATING EQUIPMENT ARRANGED IN A PROCESSING LINE

BACKGROUND OF THE INVENTION

1. Field of the Invention

The present invention relates to a method for controlling semiconductor fabricating equipment and, more particularly, to a method for preventing operational problems due to continuous operation of semiconductor fabricating equipment without any maintenance by automatically interlocking the equipment.

2. Description of the Related Art

As technology improves in the electronics industry, there has been a trend toward high integration, i.e., providing more functions in far smaller electronic devices using high density semiconductor devices. Such semiconductor devices are fabricated through highly precise processes performed in sequence by sophisticated and complex semiconductor fabricating equipment, e.g., thin film deposition equipment and etching equipment, arranged on a semiconductor fabrication processing line.

Such semiconductor fabricating equipment are on-line connected to a host computer which provides the controlling functions. An operator inputs an operation commencing command through an operator interface personal computer (O/I PC) that is on-line connected to the host computer. When the operation commencing command is input into the host computer, the host computer retrieves process data stored therein and downloads the retrieved process data into a corresponding semiconductor fabricating equipment. Thereafter, a lot of workpieces to be processed, e.g. a cassette of 25 wafers, is loaded into the corresponding semiconductor fabricating equipment by the operator or a transferring apparatus. The corresponding semiconductor fabricating equipment then performs a predetermined process with the lot according to the downloaded process data.

While the wafers in the lot are processed in the corresponding semiconductor fabricating equipment, the operator monitors the operating state of the equipment and the processed state of the wafers and records the monitoring results as data in a predetermined format on a storage device provided with the equipment. The recorded information generally includes the number of wafers actually processed by the equipment. When the operator changes, the operating state of the equipment and the processed state of the wafers are continuously recorded by another operator.

The recorded data are used for maintenance of the semiconductor fabricating equipment. Maintenance includes, for example, cleaning units such as a chamber of the semiconductor fabricating equipment, or replacing the units with new ones. The operator compares the number of wafers actually processed by the equipment to a reference number of wafers associated with the equipment, for example, the number of wafers that may be processed between maintenance cycles. According to the compared result, the operator may stop the operation of the semiconductor fabricating equipment and carry out appropriate maintenance.

However, such a conventional method suffers from a disadvantage that the comparison to determine whether maintenance is required cannot be carried out rapidly or without error. It takes a large amount of time for the operator to compare the recorded data with the reference data and determine whether to carry out the maintenance or not. In addition, in the event that the operator inadvertently fails to notice when to carry out the maintenance, the equipment would be continuously operated under poor conditions, which causes operational problems later.

SUMMARY OF THE INVENTION

It is therefore an object of the present invention to prevent operational problems with semiconductor fabricating equipment due to continuous operations of the equipment without maintenance.

It is another object to automatically compare received maintenance data with reference data predesignated in a host computer.

It is another object to automatically generate a warning message or temporarily stop the operation of the equipment according to the results of the comparison.

To achieve the above objects and other advantages of the present invention, a method for controlling semiconductor fabricating equipment includes receiving at a maintenance module (MM) in a host computer a first set of maintenance data generated from semiconductor fabricating equipment. The value of the first set is compared with a predesignated first reference threshold at the MM. If the value of the first set is not less than the first reference threshold, a warning message is displayed on a predetermined display device. The warning message indicates that it is time to perform maintenance on the fabricating equipment. Also, if the value of the first set is not less than the first reference threshold, a second set of the maintenance data is received at the MM and it is determined whether maintenance for the fabricating equipment was carried out or not. If maintenance for the fabricating equipment was not carried out, the value of the second set is compared with a predesignated second reference threshold at the MM. If the second set is not within the second reference threshold, the fabricating equipment is interlocked by the MM, whereby operation of the fabricating equipment is stopped.

In another aspect of the invention, after interlocking, the maintenance data are reset, including transmitting a reset signal to the MM, and the fabricating equipment is released from the interlocked state.

BRIEF DESCRIPTION OF THE DRAWINGS

The present invention is described in detail with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown.

Figure 1:
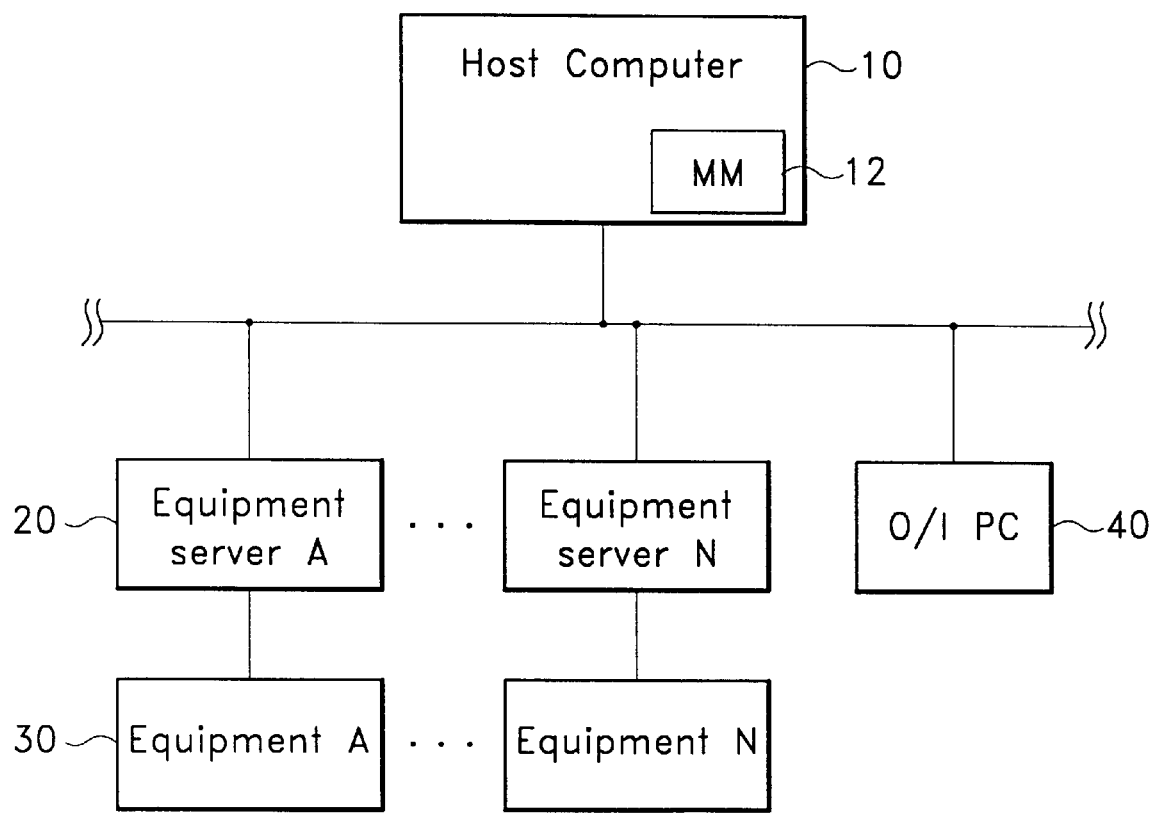
FIG. 1 is a block diagram of a semiconductor fabricating system controlling semiconductor fabricating equipment according to the present invention.

As shown in FIG. 1, a semiconductor fabricating system includes a plurality of semiconductor fabricating equipment 30 for performing predetermined processes with wafers introduced therein. A respective one of a plurality of semiconductor fabricating equipment servers 20 communicates on-line with the semiconductor fabricating equipment 30, for directly controlling the semiconductor fabricating equipment 30. A host computer 10 is connected on-line to the semiconductor fabricating equipment servers 20, for providing the semiconductor fabricating equipment 30 with large amounts of production data such as process orders, process environments and process data, and for controlling the whole semiconductor fabricating line. An operator interface (O/I) such as an O/I personal computer (O/I PC) 40 is connected on-line to the host computer 10, for providing the host computer 10 with data related to the processes to be performed in the equipment, for example, lot identification (ID), equipment ID, commands to commence or stop processing a certain lot, and commands to commence or stop operation of the equipment itself. To perform the automated processing of the present invention, a maintenance module (MM) 12 is included in the host computer 10.

The semiconductor fabricating equipment 30 and the semiconductor fabricating equipment servers 20 engage in two-way communication, for example, using a semiconductor equipment communication standard (SECS) protocol. The semiconductor fabricating equipment servers 20 and the host computer 10 also engage in two-way communication, for example, using the Terminal Connection Protocol/Internet Protocol (TCP/IP).

The method for controlling semiconductor fabricating equipment according to the present invention is as follows. For description purposes, maintenance data (M/D) generated from semiconductor fabricating equipment and related to maintenance of the semiconductor fabricating equipment are divided into two categories: a first set of M/D, which are initially received from the semiconductor fabricating equipment; and a second set of M/D, which are received from the semiconductor fabricating equipment after a warning message is generated and until a reset signal is received. The M/D may be wafer counts obtained by counting the number of wafers processed in the equipment 30, lot counts obtained by counting the number of lots introduced into the equipment 30, and equipment operation time data indicating the amount of time that the equipment 30 is operated from a certain starting point in time.

Figure 2:
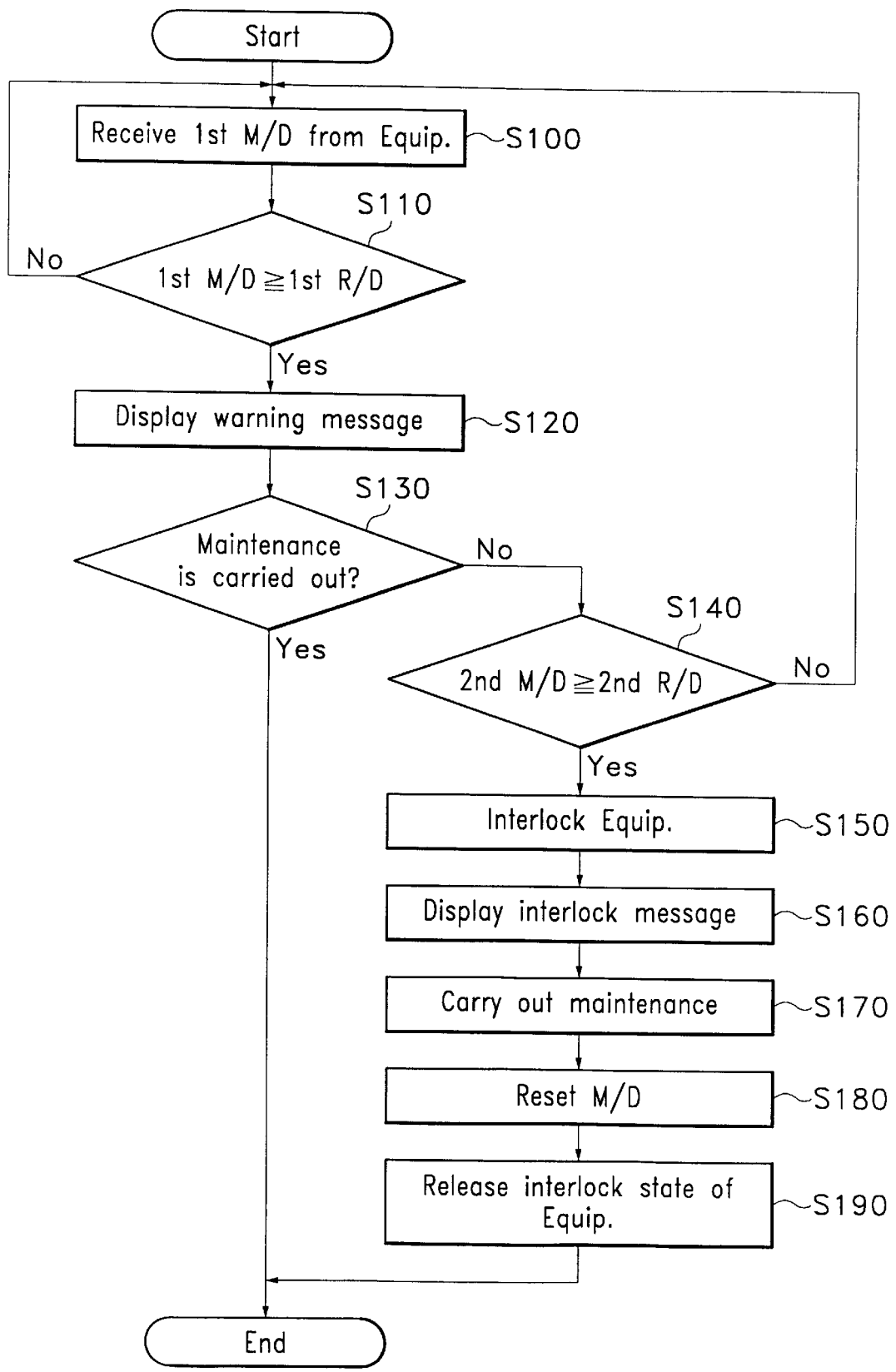
FIG. 2 is a flow chart of an embodiment of the method for controlling semiconductor fabricating equipment according to the present invention.

As shown in FIG. 2, the host computer 10 automatically receives the first set of M/D generated from the semiconductor fabricating equipment 30 with an equipment ID (identification) at step S100. Then the host computer 10 retrieves first reference threshold corresponding to that equipment ID from a database of the host computer and compares the retrieved first reference threshold with the value of the most recently received first set of M/D at step S110.

When the value of the most recently received first set of M/D is larger than or the same as the first reference threshold, the MM 12 of the host computer 10 automatically downloads a warning message, for example, into the equipment 30 and the O/I PC 40, to be displayed on a display device (not shown) of, for example, the equipment 30 and the O/I PC 40, respectively, at step S120. The warning message indicates that it is time for maintenance to be performed on the equipment 30 with the given equipment ID. Displaying the warning message on the equipment 30 and the O/I PC 40 allows far easier recognition by the operator where and when maintenance is required, than in the conventional method.

Thereafter, the MM 12 of the host computer 10 determines whether the required maintenance for the equipment 30 has been carried out or not at step S130. For example, in the event that the first set of M/D generated from the equipment 30 was not less than the first reference threshold so that a message was downloaded, the next M/D received is categorized as a second set of M/D. If the value of this second set of M/D is not less than the first reference threshold, then maintenance has not been performed. This means that the warning message has been disregarded and the equipment is continuing to perform the process.

If maintenance has not been performed the second set of M/D are continuously received from the equipment 30. The MM 12 of the host computer 10 compares the second set of M/D with a predesignated second reference threshold corresponding to the ID of the equipment 30 at step S140. For the examples where the M/D are wafer counts, lot counts, or operation times, the second reference threshold is larger than the first reference threshold.

When the value of the most recently received second set of M/D is larger than or the same as the second reference threshold, the host computer 10 forcibly interlocks the equipment 30 to stop the operation of the equipment 30 at step S150.

A step S160 may also be executed in the present invention. At step 160, the MM 12 of the host computer 10 downloads an interlock message into the equipment 30 and the O/I PC 40 to display on the display devices of the equipment 30 and the O/I PC 40 to indicate the equipment is in the interlocked state. The interlock message is displayed so that the operator can visually recognize that the equipment 30 is in the interlocked state.

After checking the displayed interlock message, the operator may perform appropriate maintenance, such as replacing units of the equipment 30 with new ones or cleaning the units, at step S170.

When the appropriate maintenance is completed, the operator may reset the M/D in the equipment 30 or the O/I PC 40 to be less than the first reference threshold, and transmit a reset signal to the MM 12 of the host computer 10 at step S180.

The MM 12 of the host computer 10 may receive the reset signal, e.g., an interlock release signal, transmitted from the equipment 30 or the O/I PC 40. Then the MM 12 would release the interlocked state of the equipment 30 at step S190, and categorize the next M/D as a first set of M/D. The operator may also manually release the interlocked state of the equipment 30. The release causes the equipment to resume operations.

As described above, the host computer 10 automatically determines a point of time to perform maintenance for the semiconductor fabricating equipment in step S110 and automatically informs the operator that it is time to perform maintenance in step S120. If the maintenance is not carried out for the equipment, the equipment is automatically interlocked in step S150. As a result of the present invention, operational problems due to continuous operation of the equipment without any maintenance can be prevented. In addition, since the host computer rapidly and automatically informs the operator when to perform maintenance on the equipment, the operator more often performs the maintenance on time. Therefore, maintenance for the equipment can be performed regularly and rapidly. As a result, the equipment can be maintained within the optimum operational state.

This invention has been described above with reference to the aforementioned embodiments. It is evident, however, that many alternatives, modifications and variations will be apparent to those having skill in the art in light of the foregoing description. Accordingly, the present invention embraces all such alternatives, modifications and variations as fall within the spirit and scope of the appended claims and their equivalents.

What is claimed is:

1. A method for controlling maintenance of semiconductor fabricating equipment, comprising:

receiving, at a maintenance module in a host computer, a first set of maintenance data generated from semiconductor fabricating equipment;

comparing a value of the first set of maintenance data with a predesignated first reference threshold;

if the value of the first set of maintenance data is not less than the predesignated first reference threshold, receiving at the maintenance module a second set of maintenance data from the semiconductor fabricating equipment;

determining whether maintenance for the semiconductor fabricating equipment was carried out, after said receiving the second set of maintenance data;

if maintenance for the semiconductor fabricating equipment was not carried out, comparing a value of the second set of maintenance data with a predesignated second reference threshold at the maintenance module; and interlocking the semiconductor fabricating equipment, if the value of the second set of maintenance data is not less than the predesignated second reference threshold, to stop operation of the semiconductor fabricating equipment.

2. The method according to claim 1, further comprising displaying a warning message on a predetermined display device, if the value of the first set of maintenance data is not less than the predesignated first reference threshold, the warning message indicating that it is time to perform maintenance on the semiconductor fabricating equipment.

3. The method according to claim 2, further comprising displaying an interlock message on the predetermined display device, the interlock message indicating that the semiconductor fabricating equipment is in an interlocked state.

4. The method according to claim 3, wherein during the displaying, the predetermined display device is a display device of an operator interface personal computer.

5. The method according to claim 3, wherein during the displaying, the predetermined display device is a display device of the semiconductor fabricating equipment.

6. The method according to claim 2, wherein after said interlocking, further comprising performing maintenance for units of the semiconductor fabricating equipment.

7. The method according to claim 6, wherein after said interlocking, further comprising:

resetting the first set of maintenance data to be less than the predesignated first reference threshold in one of the semiconductor fabricating equipment and an operator interface personal computer, including transmitting a reset signal to the maintenance module; and releasing the semiconductor fabricating equipment from an interlocked state by the maintenance module according to the reset signal.

8. The method according to claim 7, wherein said releasing further comprising categorizing next received maintenance data as a first set of maintenance data.

9. The method according to claim 2, wherein after said interlocking, further comprising:

resetting the first set of maintenance data to be less than the predesignated first reference threshold in one of the semiconductor fabricating equipment and an operator interface personal computer, including transmitting a reset signal to the maintenance module; and releasing the semiconductor fabricating equipment from an interlocked state by the maintenance module according to the reset signal.

10. The method according to claim 1, wherein during the receiving, the maintenance data are wafer counts obtained by counting the number of wafers processed in the fabricating equipment.

11. The method according to claim 1, wherein during the receiving, the maintenance data are lot counts obtained by counting the number of lots introduced into the fabricating equipment.

12. The method according to claim 1, wherein during the receiving, the maintenance data are equipment operation times indicating the elapsed operating time that the fabricating equipment has operated with reference to a designated time reference.

13. The method according to claim 1, wherein during the receiving, the second reference threshold is greater than the first reference threshold.

* * * * *